United States Patent [19]
Wood et al.

[11] Patent Number: 5,648,040
[45] Date of Patent: Jul. 15, 1997

[54] METHOD OF MAKING VACUUM CLEANER HOSE

[75] Inventors: Keith E. Wood, Asheville; Larry D. Rathbone, Waynesville, both of N.C.; Raymond P. Storti, Jr., Bloomington, Ill.

[73] Assignee: Dayco Products, Inc.

[21] Appl. No.: 569,488

[22] Filed: Dec. 8, 1995

Related U.S. Application Data

[62] Division of Ser. No. 119,469, Sep. 10, 1993, Pat. No. 5,492,151.

[51] Int. Cl.[6] .................. B29C 43/22; B29C 59/00; D01D 5/20; B27N 3/08
[52] U.S. Cl. .................. 264/508; 264/506; 264/167; 264/239
[58] Field of Search .................. 264/505, 506, 264/507, 508, 523, 167, 239

[56] References Cited

U.S. PATENT DOCUMENTS

| | | | |
|---|---|---|---|
| 2,371,991 | 3/1945 | Harding | 138/76 |
| 2,446,281 | 8/1948 | Harding | 18/19 |
| 3,201,111 | 8/1965 | Afton | 267/1 |
| 3,313,319 | 4/1967 | Osborn et al. | 138/121 |
| 3,402,429 | 9/1968 | Davidson et al. | 18/19 |
| 3,530,566 | 9/1970 | McMurry et al. | 264/230 |
| 3,794,080 | 2/1974 | Huston et al. | 138/121 |
| 3,872,893 | 3/1975 | Roberts | 264/508 |
| 4,079,757 | 3/1978 | Fischer et al. | 138/121 |
| 4,976,289 | 12/1990 | Umemori et al. | 138/122 |

*Primary Examiner*—Jan H. Silbaugh
*Assistant Examiner*—Robin S. Gray
*Attorney, Agent, or Firm*—Joseph V. Tassone

[57] ABSTRACT

A vacuum cleaner hose and method and apparatus of making the same are provided, the hose having opposite ends and a plurality of annular corrugations between the opposite ends thereof, the corrugations comprising a plurality of alternating annular crests and annular valleys that are interconnected together by annular sidewalls, each valley and each crest defining a radius at the apex thereof, each valley being narrower than the crests and having a smaller radius than the crests.

4 Claims, 2 Drawing Sheets

METHOD OF MAKING VACUUM CLEANER HOSE

CROSS REFERENCE TO RELATED APPLICATIONS

This application is a divisional patent application of its parent patent application, Ser. No. 119,469 filed Sep. 10, 1993, now U.S. Pat. No. 5,492,151.

BACKGROUND OF THE INVENTION

1. Field of the Invention

This invention relates to a new vacuum cleaner hose and to a new method of making such a vacuum cleaner hose as well as to a new apparatus for making such a vacuum cleaner hose.

2. Prior Art Statement

It is known to provide a vacuum cleaner hose formed of polymeric material and having opposite ends and a plurality of annular corrugations between the opposite ends thereof, the corrugations comprising a plurality of alternating annular crests and annular valleys that are interconnected together by annular sidewalls, each valley and each crest defining a radius at the apex thereof. For example, see the Osborn et al, U.S. Pat. No. 3,313,319, and the Davidson et al, U.S. Pat. No. 3,402,429.

SUMMARY OF THE INVENTION

It is one of the features of this invention to provide a new vacuum cleaner hose which provides good flexibility in both the lateral direction thereof and the lengthwise direction thereof while having a much lower cost of manufacture without utilizing a coiled wire spring therewith.

In particular, it has been found according to the teachings of this invention that such a hose can be formed with the corrugations or convolution thereof being deep enough to provide good flexibility but shallow enough to fill uniformally during the forming operation thereof, such as during a blow molding operation, the shape of the corrugations or convolutions being unique in that the bottom of each corrugation or convolution is kept narrow and has a small radius while the top of each corrugation or convolution is made wider and with a larger radius.

For example, one embodiment of this invention comprises a vacuum cleaner hose formed of polymeric material and having opposite ends and a plurality of annular corrugations between the opposite ends thereof, the corrugations comprising a plurality of alternating annular crests and annular valleys that are interconnected together by annular sidewalls, each valley and each crest defining a radius at the apex thereof, each valley being narrower than the crests and having a smaller radius than the crests.

Accordingly, it is an object of this invention to provide a new vacuum cleaner hose having one or more of the novel features of this invention as set forth above or hereinafter shown or described.

Another object of this invention is to provide a new method of making such a vacuum cleaner hose, the method of this invention having one or more of the novel features of this invention as set forth above or hereinafter shown or described.

Another object of this invention is to provide a new apparatus for forming such a vacuum cleaner hose, the apparatus of this invention having one or more of the novel features of this invention as set forth above or hereinafter shown or described.

Other objects, uses and advantages of this invention are apparent from a reading of this discription which proceeds with reference to the accompanying drawings forming a part thereof and wherein:

DESCRIPTION OF THE PREFERRED EMBODIMENT

Figure 1:
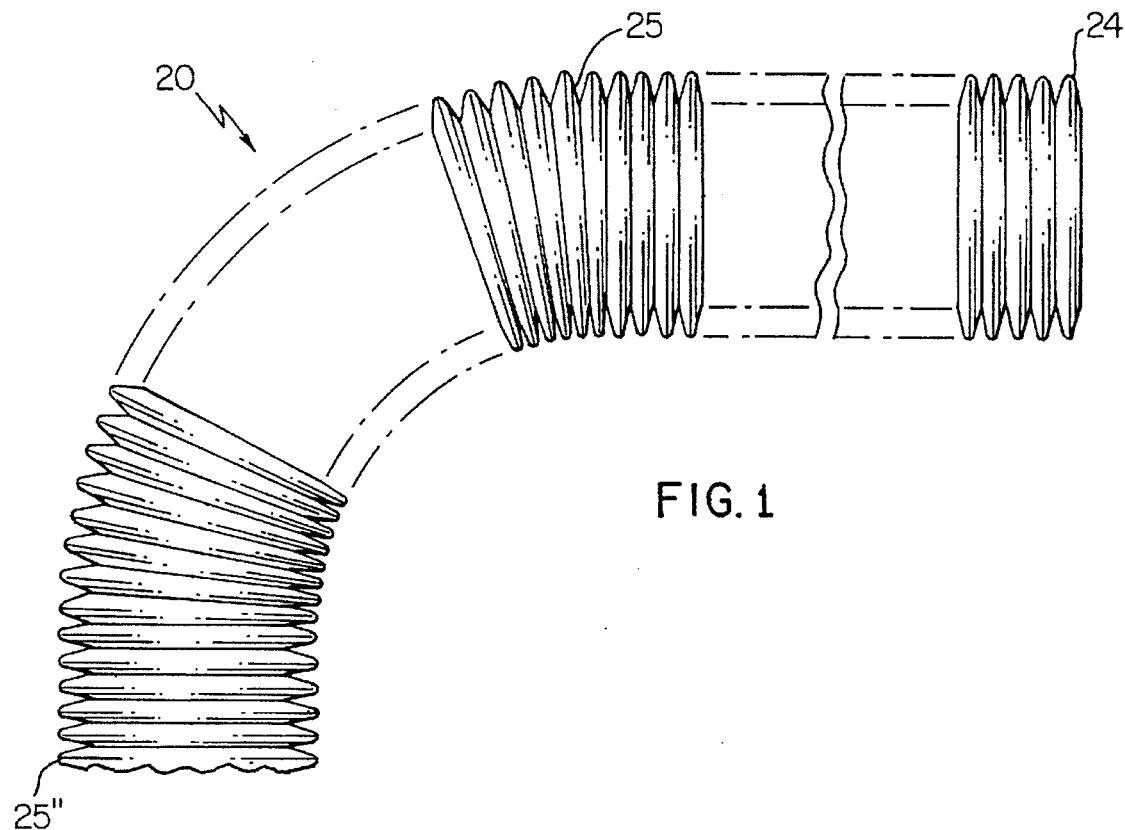
FIG. 1 is a fragmentary side view illustrating the new vacuum cleaner hose of this invention.

While the various features of this invention are hereinafter illustrated and described as being particularly adapted to provide a hose to be utilized with a vacuum cleaner, it is to be understood that the various features of this invention can be utilized singly or in various combinations thereof to provide a hose for other apparatus as desired.

Therefore, this invention is not to be limited to only the embodiment illustrated in the drawings, because the drawings are merely utilized to illustrate one of the wide variety of uses of this invention.

Referring now to FIG. 1, the new vacuum cleaner hose of this invention is generally indicated by the reference numeral 20 and is formed by any suitable polymeric material that can be suitably extruded in tubular form within a longitudinal cavity or chamber 21 of an apparatus 22 of this invention to be subsequently outwardly blow molded against annular rib means 23 of the apparatus 22 in a manner well known in the art for forming blow molded hoses. For example, see the aforementioned Osborn et al, U.S. Pat. No. 3,313,319 and the aforementioned Davidson et al, U.S. Pat. No. 3,402,429 whereby these two U.S. patents are being incorporated into this disclosure by this reference thereto.

The ridge means 23 of the apparatus 22 are so formed that the resulting hose 20 made from the apparatus 22 has opposed or opposite ends 24 and 25" and a plurality of annular corrugations or convolutions 25 between the opposite ends 24 and 25" thereof.

Figure 5:
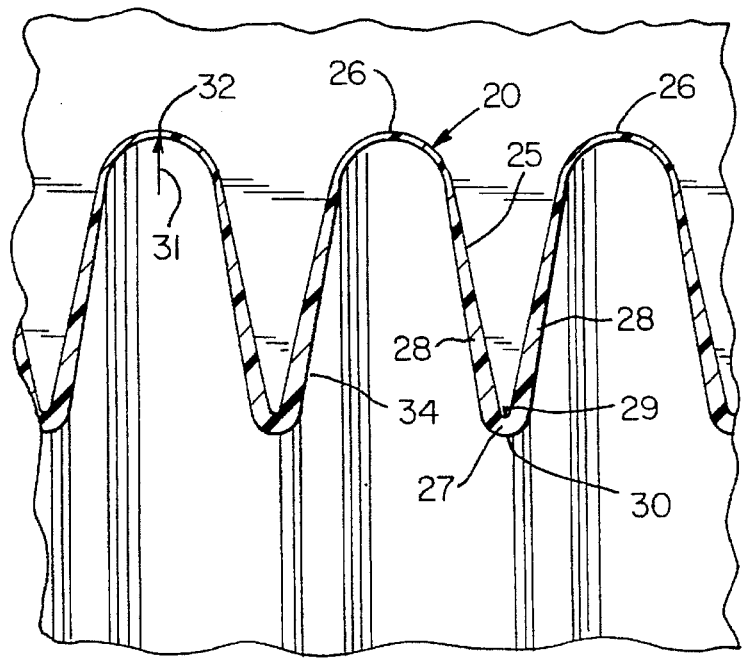
FIG. 5 is a further enlarged view of the structure illustrated in FIG. 4 and illustrates the hose of this invention being formed by the apparatus and method of this invention.

As illustrated in FIG. 5, the corrugations 25 of the hose 20 comprise a plurality of alternating annular crests 26 and annular valleys 27 that are interconnected together by annular sidewalls 28, each valley 27 defining a radius 29 at the apex 30 thereof and each crest 26 defining a radius 31 at the apex 32 thereof.

Each valley 27 of the hose 20 is narrower than the crests 26 and has a smaller radius 29 than the radii 31 of the crests 26. In addition, the valleys 27 are thicker than the crests 26 and the sidewalls 28 decrease in the thickness thereof as the same extend away from the valleys 27, the valleys 27 each having two such sidewalls 28 interconnected thereto with those two sidewalls 28 diverging away from each other as they extend away from that valley 27 while being substantially straight throughout the length thereof.

In this manner, it can be seen that the resulting hose 20 of this invention as illustrated in FIG. 5 has each valley 27 being generally V-shaped and each crest 26 being generally U-shaped.

Figure 2:
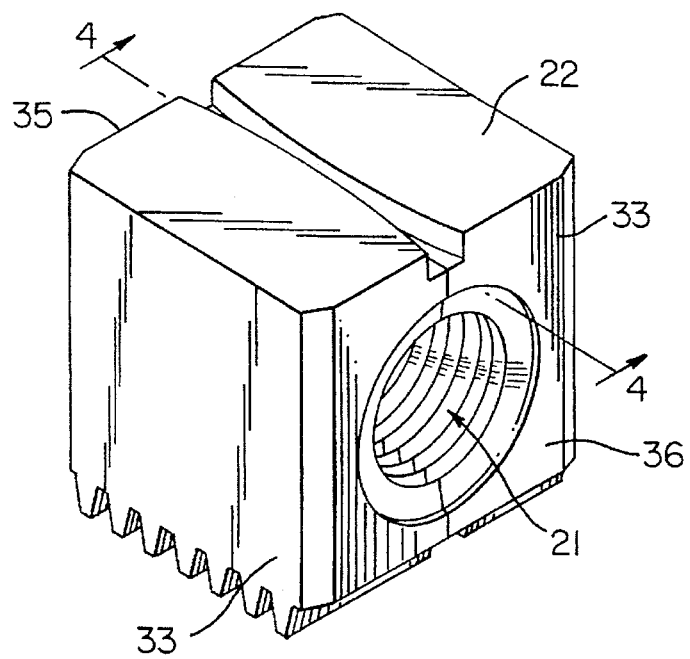
FIG. 2 is a perspective view illustrating the new apparatus of this invention for forming the hose of FIG. 1.
Figure 4:
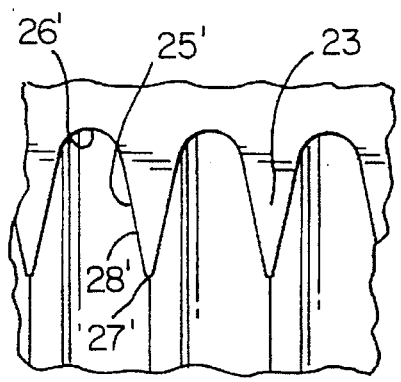
FIG. 4 is an enlarged fragmentary view of a portion of the apparatus of FIG. 3.
Figure 3:
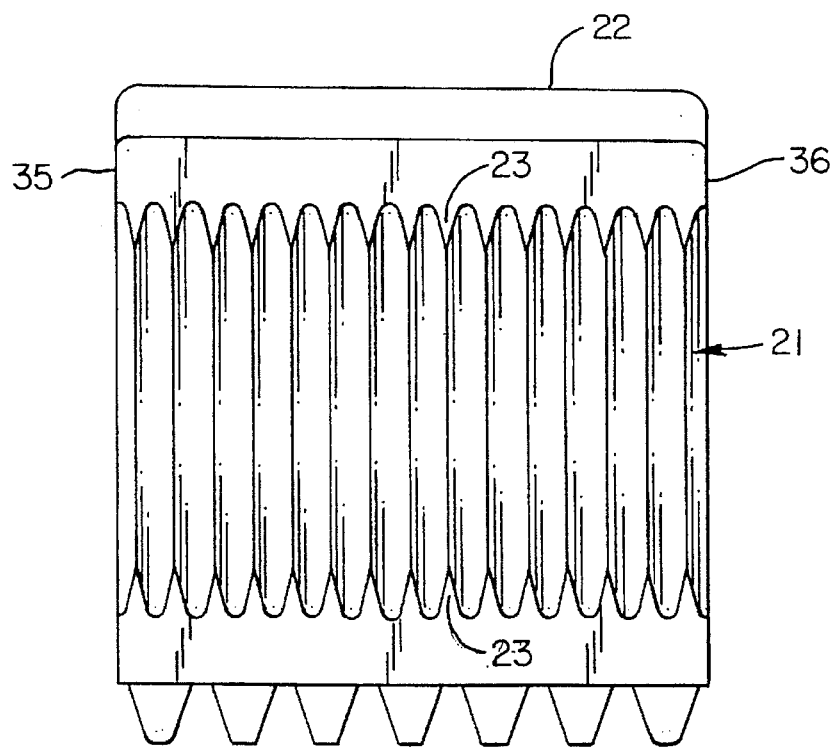
FIG. 3 is an enlarged cross-sectional view taken on line 3—3 of FIG. 2.

The apparatus 22 of this invention comprises two like halves or blocks 33 which when joined together in the manner illustrated in FIG. 2 provides the substantially cylindrical chamber 21 passing through the apparatus 22 as illustrated in FIG. 3 with the ridge means 23 being so shaped that the same form the crests 26 and valleys 27 as well as the sidewalls 28 of the hose 20 in the configuration illustrated in FIG. 5 and previously described through the well known blow molding operation.

It can be seen in FIG. 1 that the resulting hose 20 of this invention is relatively flexible in the lateral direction thereof and that the same is adapted to be stretched in the lengthwise direction thereof greater than 100% thereof from the natural condition thereof or the at rest condition thereof wherein the hose 20 has the configuration illustrated in FIG. 5 and a natural resiliency to tend to return to the condition illustrated in FIG. 5 whereby it can be seen that the hose 20 is relatively flexible in the lengthwise direction.

In fact, in one working embodiment of the hose 20 of this invention, the hose 20 can be stretched approximately 100% with only an approximately three pound pull.

Therefore, it can be seen that the hose 20 of this invention is particularly adapted to be used as a vacuum cleaner hose in a manner that is well known in the art and need not be further described.

The ridge means 23 of the apparatus 22 define a plurality of corrugations or convolutions 25' that comprise a plurality of alternating valleys 26' and crests 27' with sidewall means 28' therebetween, the structure 26', 27' and 28' of the ridge means 23 conforming to the external peripheral surface means 34 of the hose 20 as illustrated in FIG. 5.

While the hose 20 of this invention, as well as the apparatus 22 to form the same, can have any suitable dimensions, the previously described one working embodiment of the hose 20 of this invention was formed from the apparatus 22 wherein the apparatus 22 had a length of approximately 2.595 inches between opposed ends 35 and 36 thereof with the diameter being defined by each crest 27' being approximately 1.380 inches and with the diameter being defined by each valley 26' being approximately 1.800 inches. The distance between each valley 26' at the apex thereof is approximately 0.173 of an inch with the sidewalls 28' each being angled at an angle of approximately 12 degrees 26 minutes to a plane passing transversley to the longitudinal axis of the opening 21 passing through the apparatus 22. The radius forming each valley 26' of the ridge means 23 is approximately 0.045 of an inch and the radius forming each crest 27' is approximately 0.005 of an inch whereby there are approximately six convolutions or corrugations 25' of the ridge means 23 per longitudinal inch of the apparatus 22.

The one working embodiment of the hose 20 being formed from the one working embodiment of the apparatus 22 previously described has each valley 27 formed with an outside diameter of approximately 1.380 inches with the radius 29 thereof being approximately 0.005 of an inch while each crest 26 has an outside diameter of approximately 1.800 inches with the radius 31 thereof of approximately 0.045 of an inch. The hose has approximately six such corrugations 25 per inch of longitudinal length thereof when the hose 20 is in its relaxed or at rest condition as illustrated in FIG. 5. The working embodiment of the hose 20 is formed of an ethylene vinyl acetate copolymer with the valleys 27 having a wall thickness of approximately 0.015 of an inch to approximately 0.025 of an inch and the crests 26 having a wall thickness of approximately 0.010 of an inch to approximately 0.015 of an inch.

The polymeric material that is extruded into the apparatus 22 to form the one working embodiment of the hose 20 is extruded at a constant rate whereby the polymeric material at the resulting valleys 27 of the hose 20 thereof has a thicker wall than the wall at the crests 26 because the polymeric material going outwardly to form the crests 26 must stretch further to cover the area and therefore becomes thinner. The thinner top 26 and side walls 28 of each convolution 25 of the hose 20 of this invention helps to provide very good flexibility in both the lengthwise and lateral directions thereof.

While the side walls 28 of the corrugations 25 of the hose 20 have the slight diverging angle thereof from each other as they approach the crests 26 to assist the ejection of the hose 20 from the mold blocks 33 of the apparatus 22 once the hose 20 is made therefrom, the side walls 28 could be made so as to be substantially parallel to each other or have some other inward angle relative to each other as desired.

In any event, it can be seen that it is a relatively simple method of this invention to form the hose 20 of this invention from the appratus 22 of this invention in the manner previously set forth as the corrugations 25 are deep enough to provide good flexibility for the hose 20 but shallow enough to substantially uniformly fill the ridge means 23 of the apparatus 22 during the blow molding operation previously described.

Therefore, it can be seen that this invention not only provides a new vacuum cleaner hose and a new method of making such a vacuum cleaner hose, but also this invention provides a new apparatus for making such a vacuum cleaner hose.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a method of making a vacuum cleaner hose by forming said hose from polymeric material, said hose having opposite ends and a plurality of annular corrugations between said opposite ends thereof, said corrugations comprising a plurality of alternating annular crests and annular valleys that are interconnected together by annular side walls, each of said valleys and each of said crests having an apex and defining a radius of curvature and a wall thickness at the apex thereof, with said wall thickness of each of said valleys being thicker than the wall thickness of each of said crests, each side wall being substantially straight from said radius of curvature of an adjacent valley to said radius of curvature of an adjacent crest; the improvement comprising the steps of forming each of said valleys to be narrower than said crests and with a smaller radius of curvature than said crests, forming each of said valleys to be generally V-shaped and each of said crests to be generally U-shaped, forming each of said valleys with an outside diameter of approximately 1.380 inches and with said smaller radius of curvature being approximately 0.005 of an inch, and wherein each said crest has an outside diameter of approximately 1.800 inches with said radius of curvature thereof being approximately 0.045 of an inch, providing said hose with approximately six of said corrugations per inch of length thereof when said hose is in relaxed condition, and adapting said hose to be stretched in an elongated manner approximately 100 percent thereof from said relaxed condition with an approximately three pound pull thereon.

2. The method as set forth in claim 1 and comprising forming said hose such that two of said sidewalls diverge and extend away from each said adjacent valley.

3. The method as set forth in claim 1 and comprising the step of forming each of said crests to be thinner than each of said valleys.

4. The method as set forth in claim 1 and comprising the step of blow molding said polymeric material to form said hose.

* * * * *